(12) United States Patent
Gitzhofer et al.

(10) Patent No.: US 7,670,703 B2
(45) Date of Patent: Mar. 2, 2010

(54) SOLID ELECTROLYTE FUEL CELL SUPPORTED BY AN INTEGRATED REFORMER

(75) Inventors: François Gitzhofer, Rock Forest (CA); Andrzej Lasia, Sherbrooke (CA); Nicolas Abatzoglou, Rock Forest (CA); Paul Rowntree, Ste-Catherine-de-Hatley (CA); Jerzy Jurewicz, Sherbrooke (CA); Gessie Brisard, Sherbrooke (CA); Hugues Ménard, Sherbrooke (CA); Maher Boulos, Sherbrooke (CA)

(73) Assignee: Societe de Commercialisation des Produits de la Recherche Appliquee Socpra Sciences Et Genie S.E.C., Sherbrooke, Quebec (CA)

( * ) Notice: Subject to any disclaimer, the term of this patent is extended or adjusted under 35 U.S.C. 154(b) by 1212 days.

(21) Appl. No.: 10/964,605

(22) Filed: Oct. 15, 2004

(65) Prior Publication Data
US 2005/0153177 A1   Jul. 14, 2005

Related U.S. Application Data

(60) Provisional application No. 60/511,083, filed on Oct. 15, 2003.

(51) Int. Cl.
    *H01M 8/10*   (2006.01)
(52) U.S. Cl. .............................. 429/30; 429/34; 429/40; 429/19; 427/115

(58) Field of Classification Search ................... 429/30, 429/34, 44, 40, 19, 17, 38; 427/115; 422/240
See application file for complete search history.

(56) References Cited

U.S. PATENT DOCUMENTS

| 4,490,444 A | 12/1984 | Isenberg |
| 4,886,591 A | 12/1989 | Lalancette et al. |

(Continued)

OTHER PUBLICATIONS

Vernoux, P. Guindet, J., Gehain, E. and M. Kleitz, "Catalysts for Continuous Methane Reforming in Medium Temperature SOFC", Electrochemical Proceedings, V. 97-18, 219-227.

(Continued)

*Primary Examiner*—Raymond Alejandro
(74) *Attorney, Agent, or Firm*—Ogilvy Renault LLP; Dominique Pomerleau

(57) ABSTRACT

The solid oxide fuel cell can comprise: an electroconductive and porous reformer including a catalytically active material and shaped to constitute a solid slab having a first surface and a second surface opposite the first surface, and a plurality of adjacent grooves along the first surface, and flat regions adjacent the plurality of grooves; an anode layer covering the plurality of grooves of the reformer slab and having a corresponding grooved shape; an electrolyte layer covering the anode layer over the plurality of grooves of the reformer slab and having a corresponding grooved shape, and extending over the flat regions; and a cathode layer covering the electrolyte layer over the grooves of the reformer slab and having a corresponding grooved shape.

12 Claims, 9 Drawing Sheets

U.S. PATENT DOCUMENTS

| | | | |
|---|---|---|---|
| 4,895,576 A | 1/1990 | Pal et al. | |
| 5,106,706 A | 4/1992 | Singh et al. | |
| 5,171,646 A | 12/1992 | Rohr | |
| 5,192,334 A | 3/1993 | Rohr et al. | |
| 5,212,023 A | 5/1993 | Diethelm | |
| 5,328,779 A | 7/1994 | Tannenberger et al. | |
| 5,366,819 A | 11/1994 | Hartvigsen | |
| 5,486,428 A | 1/1996 | Gardner et al. | |
| 5,500,307 A | 3/1996 | Anzai et al. | |
| 5,554,454 A | 9/1996 | Gardner et al. | |
| 5,595,833 A | 1/1997 | Gardner et al. | |
| 5,601,937 A | 2/1997 | Isenberg | |
| 5,670,614 A | 9/1997 | Roby et al. | |
| 5,686,196 A | 11/1997 | Singh et al. | |
| 5,733,675 A * | 3/1998 | Dederer et al. | 429/19 |
| 5,763,114 A | 6/1998 | Khandkar et al. | |
| 5,932,146 A | 8/1999 | Kuo et al. | |
| 5,993,989 A | 11/1999 | Baozhen et al. | |
| 5,998,056 A | 12/1999 | Divisek et al. | |
| 6,048,636 A | 4/2000 | Naoumidis et al. | |
| 6,156,448 A | 12/2000 | Greiner | |
| 6,165,553 A | 12/2000 | Chen et al. | |
| 6,187,465 B1 | 2/2001 | Galloway | |
| 6,309,770 B1 | 10/2001 | Nagayasu et al. | |
| 2004/0086754 A1 * | 5/2004 | Lazaroff et al. | 429/12 |
| 2004/0185326 A1 | 9/2004 | Wetzel et al. | |
| 2006/0051643 A1 * | 3/2006 | Sarkar et al. | 429/31 |

OTHER PUBLICATIONS

Huh, Chao Yi and M. Farooque, "Carbonate Fuel Cell Materials", Advanced Materials & Processes, Jul. 2002, 31-34.

* cited by examiner

SOLID ELECTROLYTE FUEL CELL SUPPORTED BY AN INTEGRATED REFORMER

CROSS-REFERENCE TO RELATED APPLICATIONS

This application claims priority of U.S. provisional patent application 60/511,083, filed Oct. 15, 2003 the specification of which is hereby incorporated by reference.

BACKGROUND OF THE INVENTION

1) Field of the Invention

The invention relates to solid electrolyte fuel cells and, more particularly, to reformer supported solid electrolyte fuel cells.

2) Description of the Prior Art

Fuel cells are electrochemical devices that convert chemical energy in fuels (such as hydrogen, methane, butane or even gasoline and diesel) into electrical energy by exploiting the natural tendency of oxygen and hydrogen to react. By controlling the means by which such reaction occurs and directing the reaction through a device, it is possible to harvest the energy given off by the reaction.

One of the important applications for solid oxide fuel cells (hereinafter referred to as SOFC) are auxiliary power units (APU) for transportation applications. A SOFC APU generates power using hydrogen and carbon monoxide reformed from fuels such as gasoline, diesel, natural gas, biodiesel, and the like.

SOFC are now considered for distributed power generation with natural gas being the major fuel. Researchers and Industry are looking for lowering the working temperature of these SOFC down to 500 to 700° C. At these medium operating temperature, major innovations can be integrated in the design of the SOFC. The reformer operating temperature should be considered as a major design criterion for the SOFC. Researchers have shown that 500° C. can be considered a lower temperature limit for a high conversion of the natural gas. Furthermore, the overall performance of the SOFC is directly inversely proportional to the electrodes thickness which drives ohmic losses and to the electrolyte thickness which drives the ionic conductivity and operating temperatures of the electrolyte. However, certain considerations of the flow of electrons along the very small thickness of the anode and the cathode will increase the electrical resistivity and special attention has to be given.

One can distinguish three designs for the SOFC: (a) the cathode supported SOFC (i.e. Westinghouse now Siemens in Pittsburgh), (b) the electrolyte supported SOFC (Siemens Erlangen Germany), and (c) the anode supported SOFC (Centre for Atomic Energy in Julich Germany).

SUMMARY OF THE INVENTION

It is an object of the present invention to provide a new solid oxide fuel cell (SOFC) designed to operate at a temperature ranging between 500 and 700° C. and which addresses the above concerns.

One aspect of the invention provides a reformer supported solid oxide fuel cell comprising:

an electroconductive and porous reformer including a catalytically active material and shaped to constitute a slab having an unexposed first surface and a second surface opposite the first surface, and a plurality of adjacent grooves along the first surface, and flat regions adjacent the plurality of grooves;

an anode layer having an unexposed first surface superposed to the first surface of the reformer slab and a second surface opposite the anode first surface, the anode layer covering the plurality of grooves of the reformer slab and having a corresponding grooved shape;

an electrolyte layer having a first surface superposed to the second surface of the anode layer and a second surface opposite the electrolyte first surface, the electrolyte layer covering the anode layer over the plurality of grooves of said reformer slab and having a corresponding grooved shape, and extending over the flat regions; and a cathode layer having an unexposed first surface superposed to the second surface of the electrolyte layer, the cathode layer covering the electrolyte layer over said grooves of said reformer slab and having a corresponding grooved shape.

Another aspect of the invention provides a reformer integrated into a solid oxide fuel cell. The reformer comprises a slab of an electroconductive mixture of an active material and a polymeric ceramic material. The slab has waves on a least one surface thereof and a flat surface at least partially surrounding the grooved surface of the slab. The slab is provided with successive layers of an anode material, an electrolyte material, and a cathode material on the waved surface to constitute the solid oxide fuel cell, only the electrolyte material covering the flat surface.

A further aspect of the invention provides a method for preparing a reformer supported solid oxide fuel cell. The method comprises: shaping a mixture of an active material and a polymeric ceramic material under conditions to constitute a reformer slab having grooves on at least one surface and a flat region extending at least partially in the periphery of the slab; depositing an anode material onto the grooved surface of the slab, the anode material extending short of the flat regions; depositing an electrolyte material onto the anode material and the flat regions; and depositing a cathode material onto the electrolyte material, the cathode material covering the same surface area than the anode material.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The invention relates to a reformer supported SOFC that preferably utilizes nanostructures and operates under medium temperature, such as between approximately 500 and 700° C.

Figure 1:
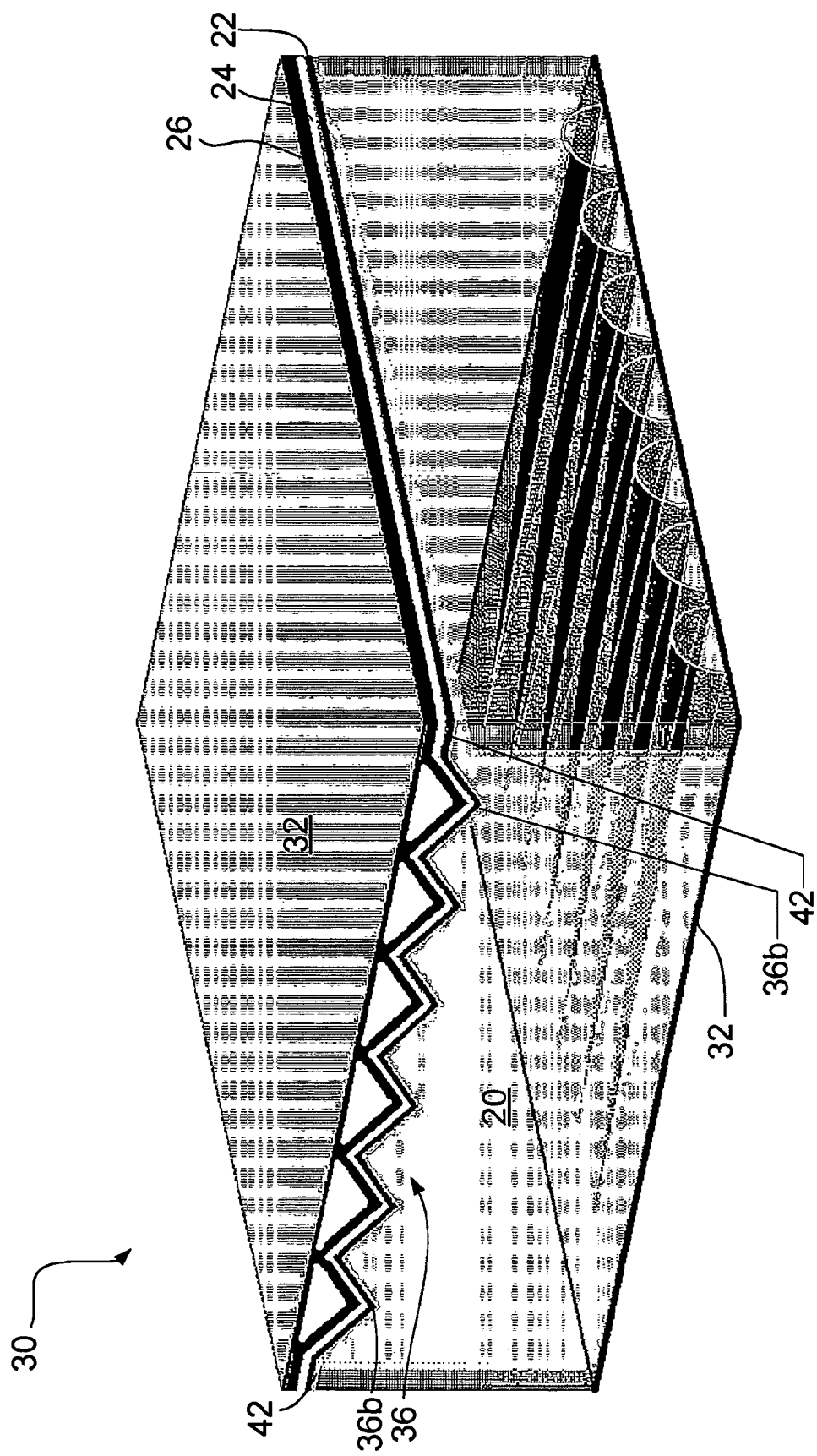
FIG. 1 is a schematic perspective view of an individual cell in accordance with an embodiment of the present invention.

Referring to FIG. 1, it will be seen that onto a reformer 20, three layers of 5 to 100 micrometers each of an anode 22, an electrolyte 24 and a cathode 26 are applied.

Figure 2:
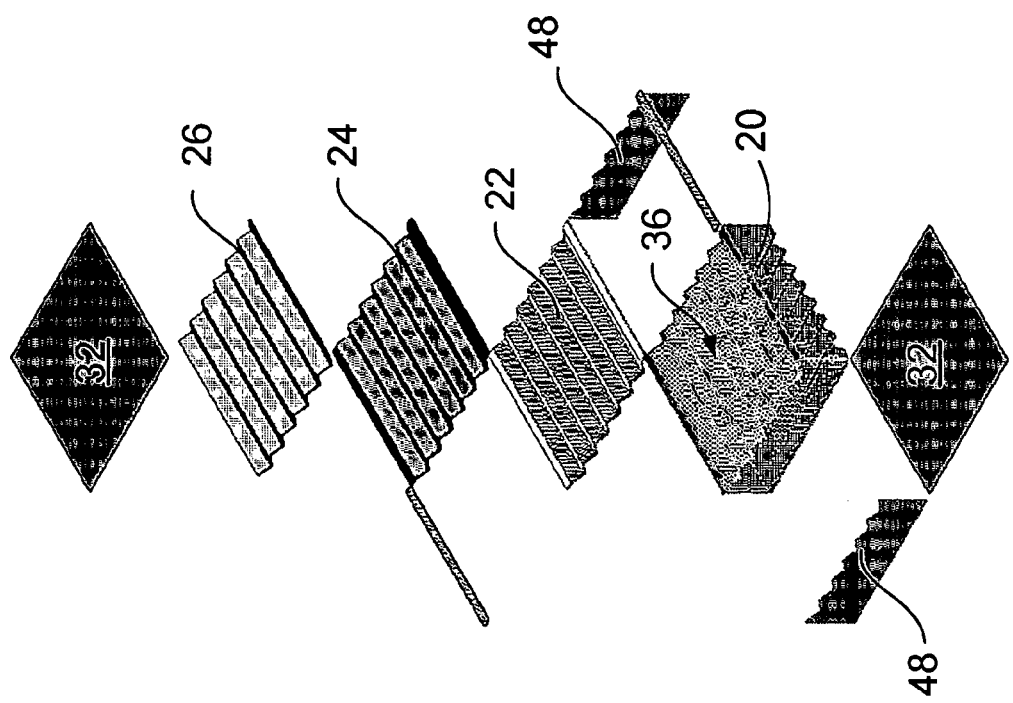
FIG. 2 is an exploded view of the individual cell incorporating a reformer in accordance with the invention.

An embodiment of an individual cell 30 will now be described with reference to FIG. 2. First, a bipolar plate 32 is provided. The bipolar plate 32 is a base metal plate of refractory steel without channel. Typical dimensions of the base metal plate 32 are 0.1×0.1 m to 0.3×0.3 m with a thickness 2 mm or less. The bipolar plate 32 is preferably resistant to corrosion, resistant to reducing conditions (usually $H_2$), and it is preferably dimensionally stable relatively to temperature changes.

Figure 3:
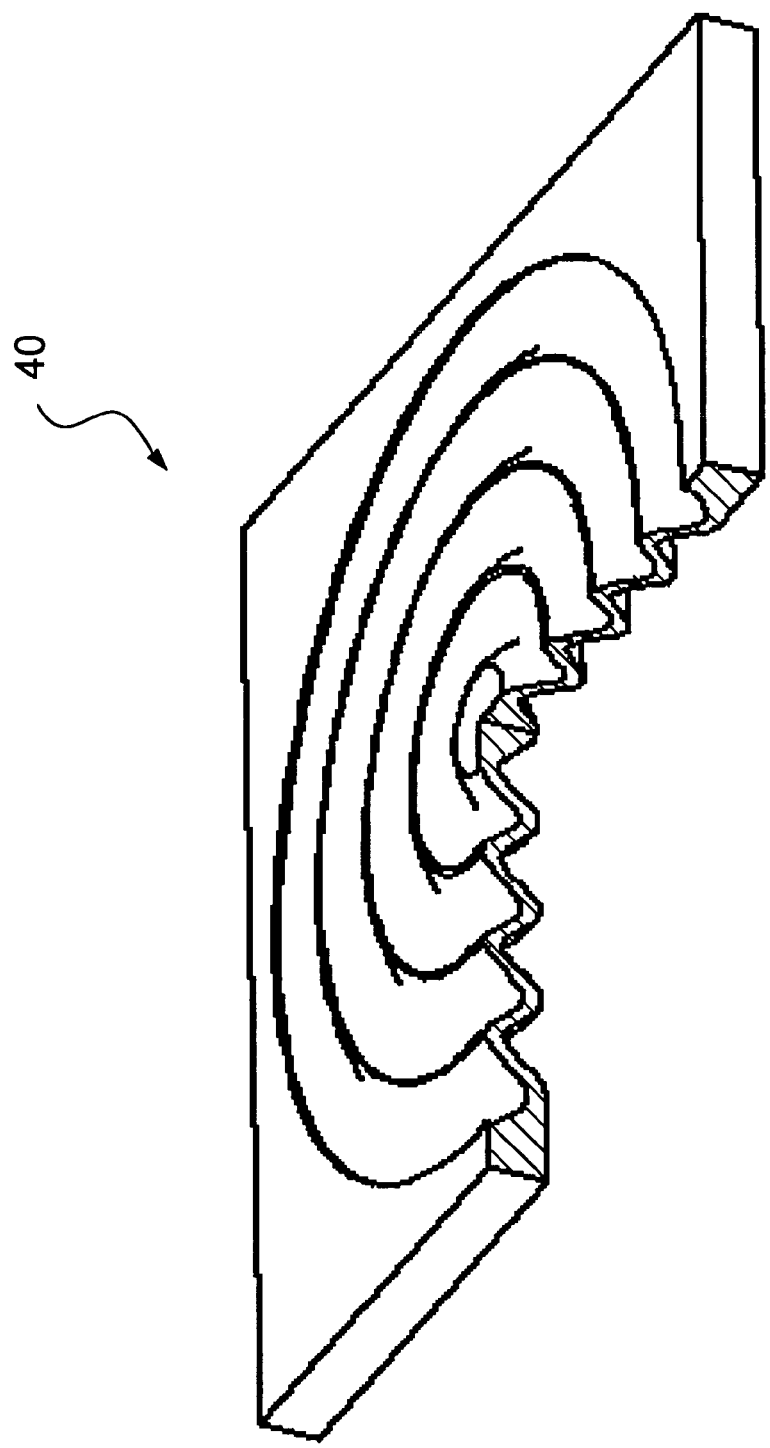
FIG. 3 is a perspective view, partially sectioned, of a die matrix for producing the reformer in accordance with an embodiment of the present invention.
Figure 4:
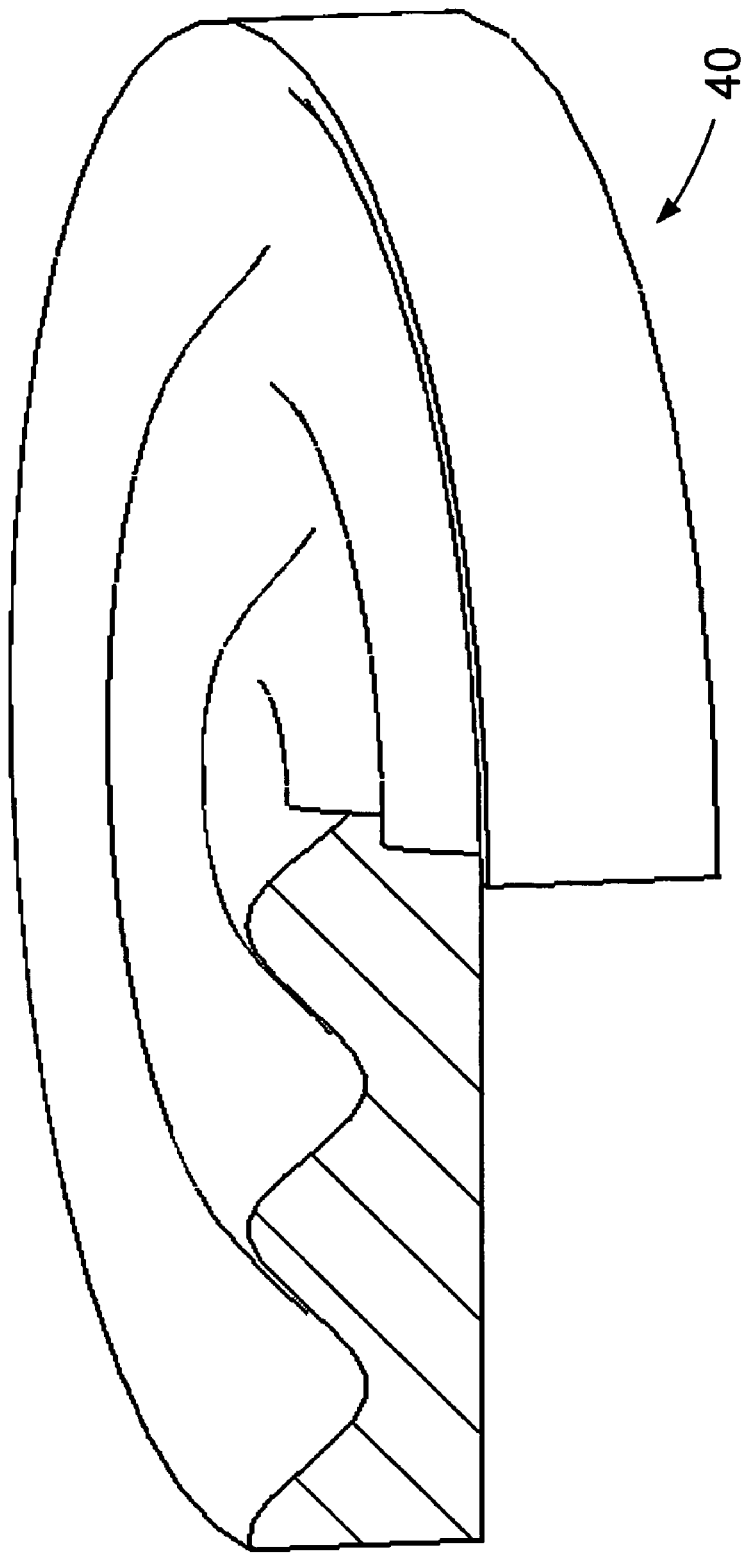
FIG. 4 is a perspective view, partially sectioned, of another die matrix for producing the reformer in accordance with another embodiment of the present invention.

The reformer 20 is prepared by pressing powders having a predetermined composition with a die matrix 40 (FIGS. 3 and 4) that has the negative pattern of the reformer 20. The reformer consists of a mixture of an active material mixed with up to 30 wt % of polymeric ceramic according to U.S. Pat. No. 4,886,591, for example. The reformer 20 is preferably an electrical conductor. The thickness of the reformer 20 is in the range of 1 to 5 mm. A first surface 36b of the reformer 20 has a plurality of adjacent grooves 36, as shown on FIGS. 1 and 2. On FIGS. 1 and 2, the reformer 20 has a plurality of longitudinal waves. Referring to FIG. 3, it will be seen that grooves 36 are produced by a press (not shown) with a die matrix 40 designed for having a predetermined pattern. One skilled in the art will appreciate that it can also be produced through extrusion, casting or a powder metallurgy punching process. The reformer 20 can also be produced by thermal plasma deposition with a shape forming process in a die matrix 40. FIG. 4 shows another possible pattern with radial waves. The grooves or waves 36 allow to increase the active surface of the fuel cell to minimize the stresses, and to insure a gas distribution and an improved electric contact.

Compaction of the reformer 20 is then followed by a sintering step below approximately 700° C. The reformer 20 is preferably pressed and fired onto the base metal plate 32 to provide sufficient adhesion.

On the sides of the reformer 20, along the grooves periodicity, there is a flat region 42, or flat side or surface, for sealing purpose with the electrolyte 24, as it will be described more in details later.

The reformer is then coated with the anode 22 that is sprayed using a powder or a suspension as precursors onto the reformer 20 including the waves 36. The sprayed anode 22, preferably having a thickness between 20 and 100 micrometers, consists of a composite material made of a mixture of electrolyte and metal catalyst. Ceramic anode and more oxidation resistant anode can also be used. The sprayed area stops at the last wave 36b and does not extend onto the flat sides 42.

The electrolyte 24 is then sprayed onto the whole area of the anode 22 plus the flat sides 42 of the reformer 20. The electrolyte 24 is a ceramic ionic conductor, for example, it can be stabilized zirconia, cerium oxide doped with a plurality of doping materials such as Gd, Sm or Y or mixtures of both. The electrolyte thickness is preferably in the range of 5 to 50 micrometers.

Once the electrolyte 24 is sprayed, the cathode 26 is sprayed over with a suspension or powder based spraying technology. A typical cathode 26 is a perovskite material of the type LSM (Lanthanum Strontium Manganate), for example $LaSrMnO_3$, LSF (Lanthanum Strontium Ferrite), LSC (Lanthanum Strontium Cobalt), LSCF (Lanthanum Strontium Cobalt Ferrite), SmSrCo, or GdSrCo having a thickness of 50 micrometers or less. The cathode 26 is sprayed onto the electrolyte 24, covering the same surface area as the anode 22. Therefore the flat sides 42 are only covered with the electrolyte 24.

Even if the anode 22, the electrode 24, and the cathode 26 are sprayed by the method described hereinabove, one skilled in the art will appreciate that other deposition methods can be used.

A fine metal sheet 32 is then put on top and another cell 30 is added, until a stack or an assembly is obtained.

Figure 5:
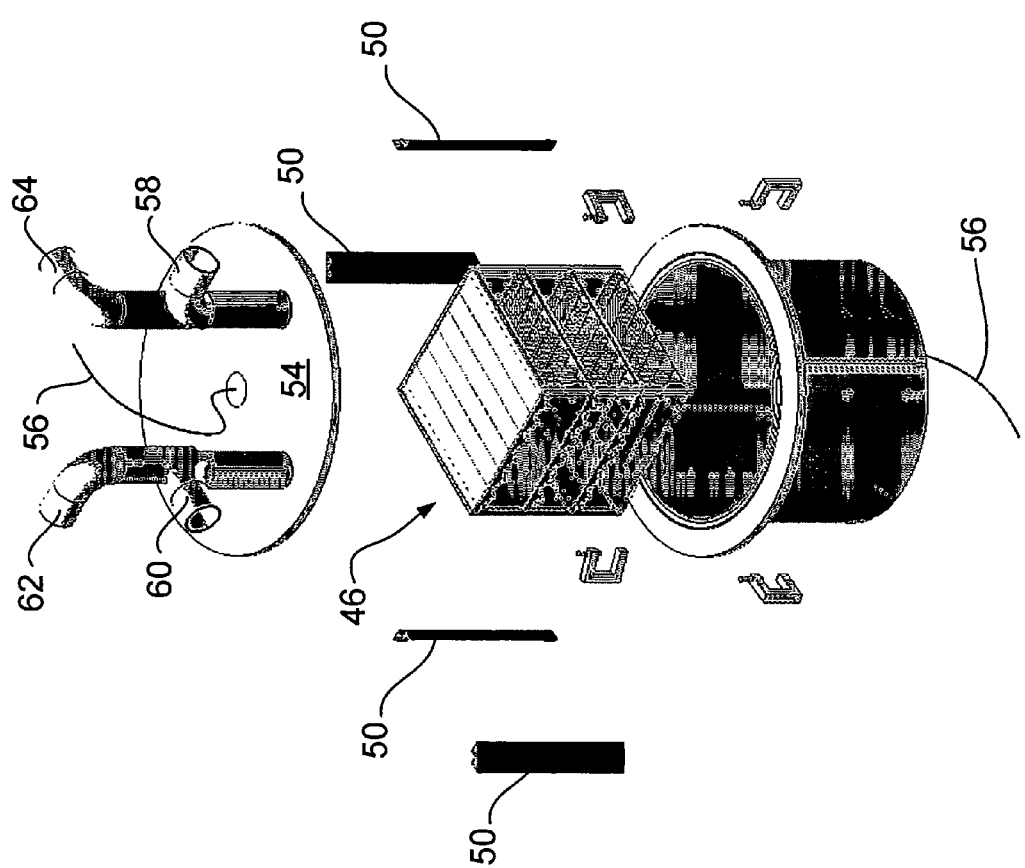
FIG. 5 is an exploded view of a stack design of a cell incorporating the reformer in accordance with the invention.

Referring now to FIG. 5, it will be seen that a number of manufactured individual cells 30 are stacked, or associated, into an assembly 46. For example, twenty (20) individual cells 30 can be superposed. They are selectively coated with a sealant 48 on the sides to avoid undesired cross flow of gas. The sealant is preferably a high expansion coefficient glass material that wets very well the assembly 46 and the material of a supporting structure 52. They are also retrofitted with four sidings 50 which are electrically insulated and which should also separate the gas and create a manifold.

A firing of the assembly 46 is then carried out at a temperature ranging between 500 and 800° C. in order to seal the siding and to relax any residual stresses. The firing should be assisted with a static load applied during the isothermal part of the firing at high temperature for keeping all the cells flat and improving electrical contacts.

Still referring to FIG. 5, there is shown that the supporting structure 52 of the embodiment described is cylindrical with two caps or ends 54. Electrical contacts 56 are to be provided at each end of the cylindrical supporting structure 52. The cylinder cap 54 can be specially textured (diaphragm type) to exert a contact pressure which is important for sealing and electrical contact. It also supports a gas inlet 58, an air inlet 60, a gas outlet 62, and an air outlet 64. Both caps 54 can then be closed by welding for instance, or other sealing means.

The fuel cells 30 produced in the above described manner are adiabatic SOFC, where the heat generated by the cell operation is used by the endothermal reforming reaction.

In reformer supported SOFC (RS-SOFC), the reformer has a thickness in the range of millimeters and is a support to build up the anode, the electrolyte and the cathode. The RS-SOFC has preferably a planar geometry but applications with discoidal or tubular geometry are also possible.

The RS-SOFC is preferably produced by spraying the various layers (anode, electrolyte, and cathode) at various pressures with various technologies such as induction plasma, chemical or physical vapor deposition, DC plasma, thermal spraying and cold gas spraying.

The reformer preferably has a working temperature in the range of 500 to 700° C. and can accommodate various fuels such as natural gas, methanol, ethanol, gas, kerosene or diesel reforming in-situ in the SOFC. The reformer can preferably accept CO as well as Syngas. The reformer is preferably sulfur tolerant.

The reformer is composed of nanosized materials, is a porous electrical conductor, and is preferably resistant to thermal cycles. The reformer can include ruthenium and other catalysers. The reformer preferably minimizes the usual air flow intake because of the possibility of a heat balancing endothermal reaction.

It is possible to use a graded composition reformer, such as the ones manufactured according U.S. Pat. No. 4,886,591 with modifications to permit the composition gradients, to allow for various kinetic of reactions which take place in the reformer.

The reformer has preferably a porosity high enough to allow for gas diffusion, to eliminate water and enhance the reforming reaction. The reformer is preferably a heat conductor to provide low temperature gradients in the SOFC.

The anode which is sprayed onto the reformer contains a percentage of nanosize or microsize grains for higher efficiency. As for the reformer, it is possible to use a graded composition anode. For example, the composition can slowly and gradually change from the anode composition to the electrolyte composition.

The electrolyte which is sprayed onto the anode and is also used as a sealant for the gas contains a significant percentage of nanosize grains for higher efficiency. Furthermore, the cathode, which is sprayed onto the electrolyte, also contains a significant percentage of nanosize grains for the same reasons.

The bi-polar plate is preferably a thin metal sheet.

The sealing is carried out by glass impregnation or other methods on a selective area.

EXAMPLE 1

In a first example, a reformer, which was also the support of the individual cell, had a composition of 90% wt of nickel and 10% wt of $LaPO_4$. The particles were mechanically screened to obtain particles having a size between 38 and 125 μm.

0.75 grams of particles were pressed in a 12 mm diameter die matrix having a wavy surface, such as the ones shown on FIGS. 3 and 4. The pressure applied was 10 mV during 10 minutes.

Figure 6:
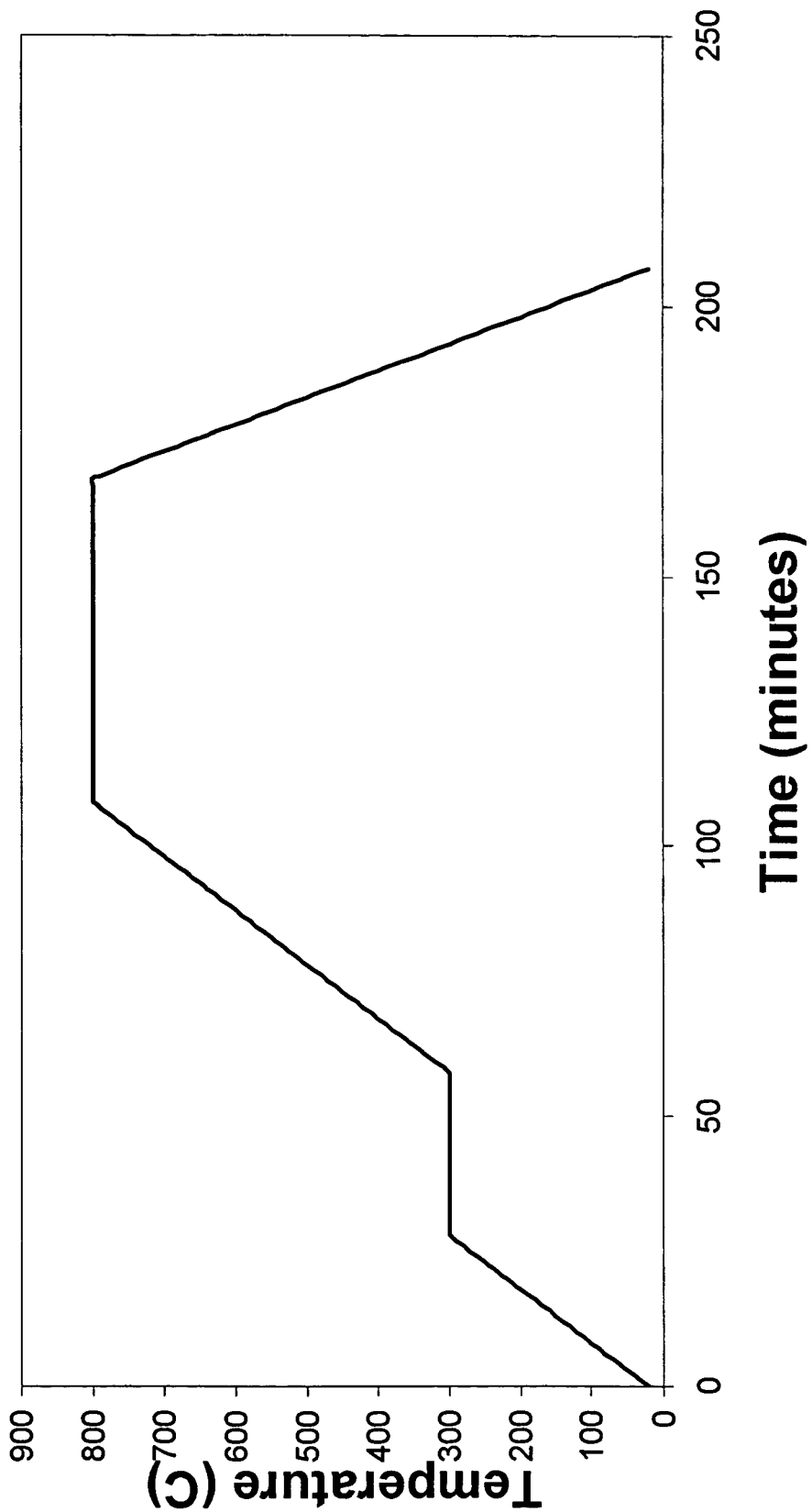
FIG. 6 is a graph showing a sintering cycle of the reformer in accordance with the invention.

Then, the pressed particles were sintered in a Lindberg sintering furnace with the cycle shown on FIG. 6 in an argon and hydrogen atmosphere. The porosity of the reformer thus obtained was controlled with an air flow of 150 mm. The porosity control is a crucial step for the performance of the SOFC.

The support is the surface on which one carries out the deposition of, initially, the anode, then the electrolyte, and finally the cathode. This support must have several qualities. Above all, it must allow the passage of hydrogen. Thus it must be as porous as possible. In addition, if plasma projections are used to deposit the other layers, it is on it that will be carried out the various plasma projections. During these plasma deposition, it undergoes important thermal stresses. It is also part of the unit constituting the cell. Therefore, the support must be resistant to thermal stresses and, particularly, it should not undergo sintering during these various phases of thermal stress. Moreover, since it is used as a support for the cell as its name indicates, the rigidity of the cell obtained by plasma must be ensured by the support which must have a high mechanical resistance.

The support is positioned on the anodic side. Therefore, during the operation of the fuel cell, it is subjected to reducing conditions (usually, $H_2$ at temperatures ranging between 600 and 850° C.). To avoid deformations during the operation of the fuel cell, the support must thus be in its already reduced form. For example, for a nickel support, it must be in the form Ni with the oxidation level zero. It is one of the reasons which requires that the sintering of the substrate support be made under reducing atmosphere.

If the support must be heated, the oxidizing conditions must be avoided as this would induce an increase of the mass, for example, Ni becoming NiO. Consequently, a deformation of the network and the whole shape of the reformer would occur. This is particularly important if the electrolyte is already deposited. Indeed, the electrolyte being a ceramic, it is impossible for it to follow the stresses that appear when a massive oxidation of the support material is taking place. If one must heat the unit constituting the cell after the deposition of the various constitutive layers, care must be taken that heating be carried out under an inert atmosphere ($N_2$, Ar, He).

Another characteristic of oxidized support material, for example oxidized nickel, is that it is less mechanically resistant, increasing the cell likeliness of breaking. For example, at the time of preparation of the nickel substrate, a fraction of nickel oxide was included in the mixture of powders. This was done to increase the porosity of the final substrate. Indeed, while carrying out the sintering of the powders under reducing atmosphere, these oxide powders passed from an oxidation degree of level +11 to level 0, which was accompanied by a loss of mass (NiO: 75 g/mol; Ni: 59 g/mol) accompanied by a reduction in the volume of the particles, which results in an increase of the porosity.

Figure 7:
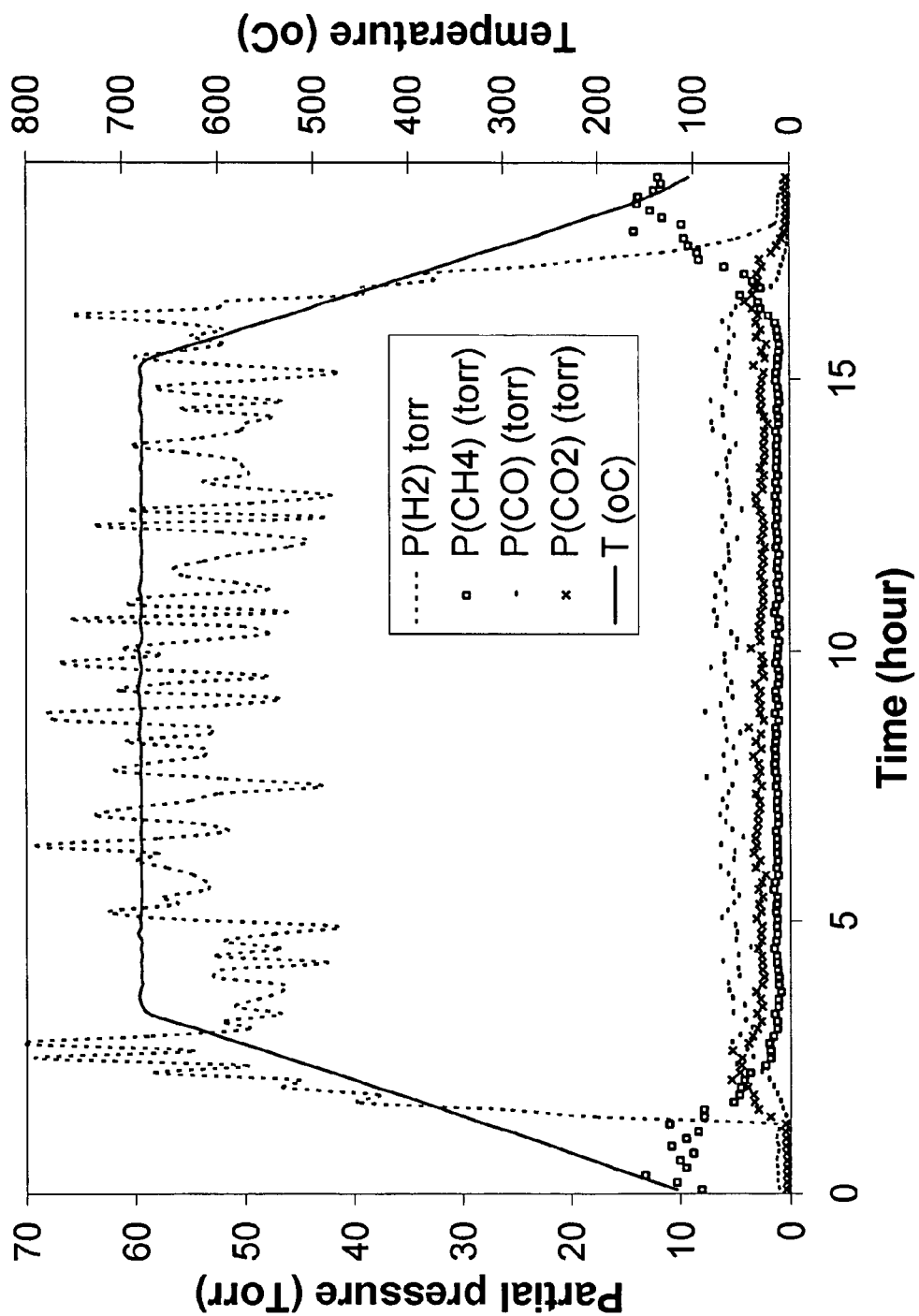
FIG. 7 is a graph showing the performance of the reformer in accordance with the invention.

FIG. 7 shows the performance of the reformer produced by the technique described hereinabove.

Even if a nickel reformer was produced in the above described example, one skilled in the art will appreciate that the desired properties of the reformer would be similar if other materials are used for the reformer.

EXAMPLE 2

This example relates to the preparation and the evaluation of powdered nickel catalysts for SOFC applications.

Powdered Ni was supplied by Inco (INCO 255) and was used as received. Reduction of the powder under $H_2$ atmosphere prior to use did not have any significant effects. The powder had a particle size range from 1 to 20 micrometers in diameter as determined by a Malvern particle sizer. The BET area of the powder was 0.44 $m^2$/g. This material was selected because of its irregular surface topology, but other starting types have been used with similar results.

The raw powder was inserted into a catalytic quartz test tube designed for the reactor system. These quartz tubes supported the catalytic material on a one-cm diameter fritted quartz disk and attached to the source gas supply by a 20 cm long, ¼" diameter quartz tube. The quartz frit and catalytic material were open to a surrounding quartz envelop which directed the product gases back to the analysis sampling port. The active catalytic region was approximately positioned in the center of a commercial furnace (Omega Engineering Inc.) and the temperature was controlled from ambient to 1000° C. The front door of the furnace was modified to pass seven identical test systems into the heated volume. The dimensions, geometry, and orientation of these test tubes are not critical to the successful operation of the catalyst. Each evaluation was replicated in adjacent tubes, and on repeated runs of the temperature ramp profile.

0.25 g of the nickel powder was lightly packed onto the quartz frit, and covered by a small plug of quartz wool that serves to prevent blow-through of the catalyst material with the feed-gas flux. The wool also served to maintain the geometric integrity of the nickel powder during the thermal cycling and aggregation process.

Gas mixtures were prepared using research purity gases (Praxair Inc.) and the ratios were controlled by volumetric rotometers (Omega Engineering Inc.). The $H_2O$ content of the feed gas was controlled by saturating the feed gas in a glass bubbler; all water was deionized prior to use. The feed gas and product gas compositions were measured using a custom-designed quadrupole mass spectrometer system for real-time measurements. Each sample gas inlet was delivered to the mass-spectrometer system by a pressure reduction manifold, and mass spectra were repeatedly scanned for approximately 1 to 5 minutes prior to the admittance of the next mixture. Signal levels were calibrated in the same apparatus under identical conditions using pure gases. Typical mixtures included $CH_4/H_2O$ ratios of 1/1 to 1/3. The results reported herein were obtained with a 1/2 ratio containing 10 torr $CH_4$, 20 torr $H_2O$ and the balance was Ar. The total delivery pressure at the catalyst bed and sampling orifice was approximately 760 torr. The flow rate of the feed gas was 30 ml/min.

The experiments were performed by monitoring the product gas composition as a function of time with three specific stages: (1) the temperature of the catalyst bed is increased from 25° C. to 700° C. at a rate of 3° C./minute; (2) a constant temperature phase at 700° C., and finally a cooling cycle at −3° C./minute.

Figure 8:
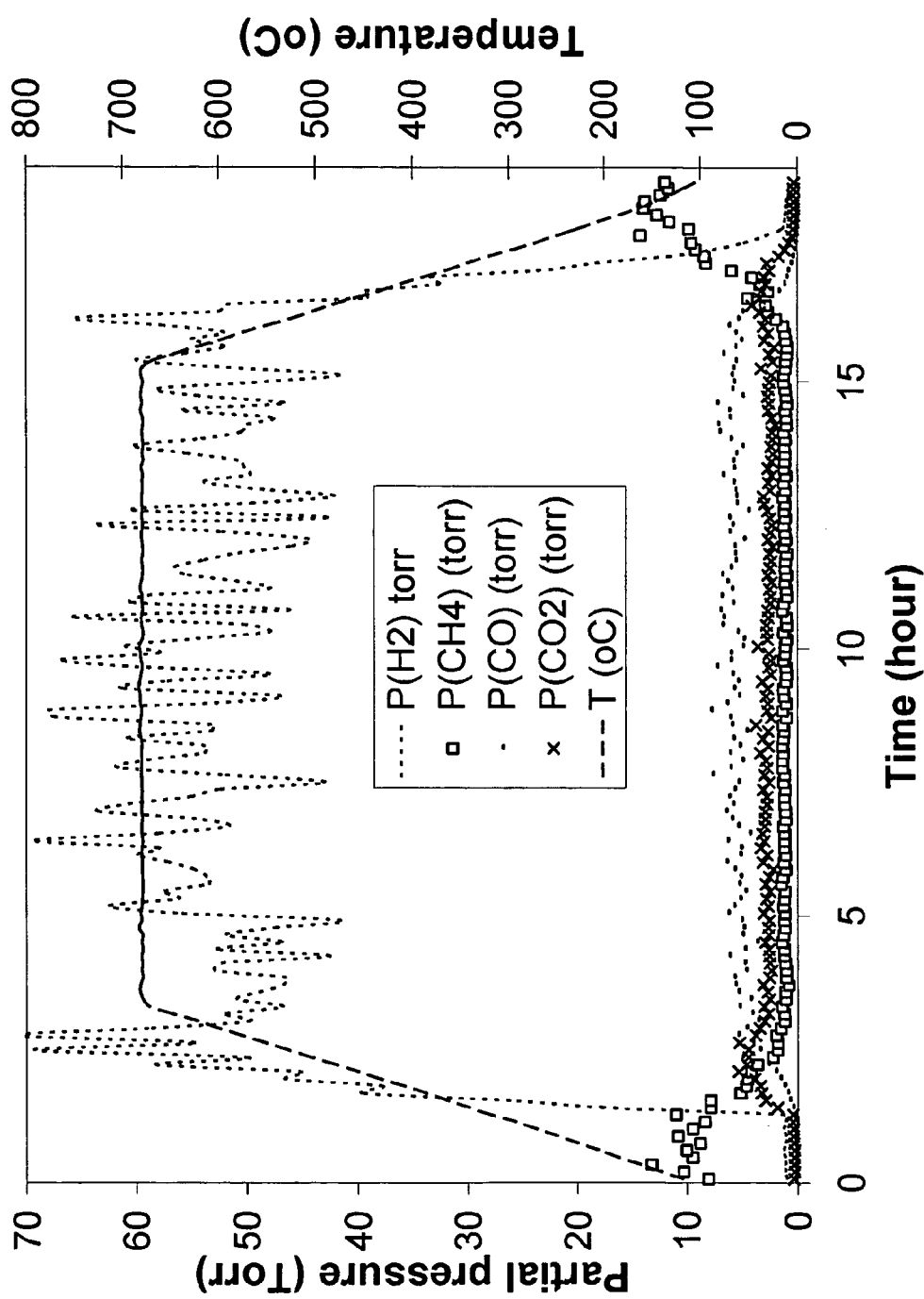
FIG. 8 is another graph showing the performance of the reformer in accordance with the invention.
Figure 9:
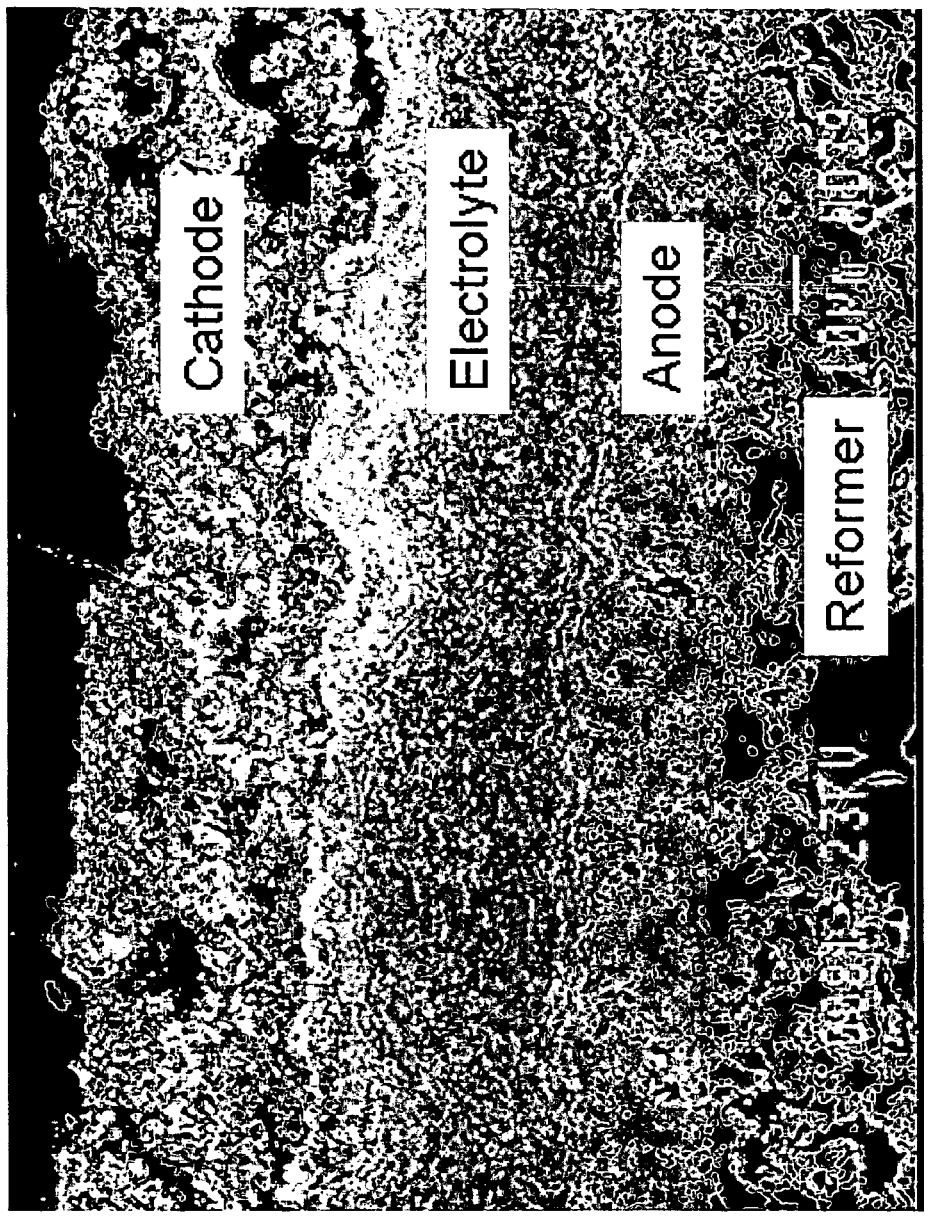
FIG. 9 is a microstructure of a typical sprayed cell on a reformer support in accordance with the invention.

FIG. 8 shows a typical plot of the $CH_4$, $H_2$, CO and $CO_2$ pressures measured at the sampling orifice over the experimental run. It also shows the temperature profile. The sharp reduction in the $CH_4$ pressure and the increase in the $H_2$, CO and $CO_2$ species demonstrate that the catalyst is active above 325° C., and reaches a maximum at approximately 500° C. At the 700° C. holding temperature of the second phase of the experiment, the measured conversion rate of the methane has exceeded 95%. The gas composition is approximately identical during the first and third phases for a given temperature, indicating that the catalyst is not suffering measurable degradation over the course of the experiment. The same catalyst material can be reused with no apparent loss of activity.

EXAMPLE 3

The following example concerns the deposition of an anode onto the reformer. The anode was sprayed using spraying parameters described in Table 1 on top of the pressed and sintered reformer. A nitrate solution-suspension was used but a powder can also be used.

TABLE 1

| | |
|---|---|
| Anode material: | NiO |
| Electrolyte material [GDC, SDC or others]: | GDC |
| Solution - Anode | |
| | |
| Anode - Raw material [Nitrate or others]: | Nitrate |
| Exact chemical composition (including hydratation): | $Ni(NO_3)_2 * 6H_2O$ |
| Anode salt weight [g]: | 40.8628 |
| Solution - Electrolyte | |
| | |
| Electrolyte - Raw material [Nitrate or others]: | Nitrate |
| Exact chemical composition (including hydratation): | $Ce(NO_3)_3 * 6H_2O$ |
| Electrolyte salt weight [g]: | 56.4806 |
| Additive - Raw material [Nitrate or others]: | Nitrate |
| Exact chemical composition (including hydratation): | $Gd(NO_3)_3 * 6H_2O$ |
| Additive salt weight [g]: | 14.551 |
| Molar ratio additive/electrolyte [% wt]: | 25 |
| Plasma deposition | |
| | |
| Plasma torch [PL-35, PL-50]: | PL-50 |
| Nozzle diameter [mm]: | 45 |
| Nozzle type: | Standard |

TABLE 1-continued

| | |
|---|---|
| Sheathing gas [$O_2$, Ar, or others]: | $O_2$ |
| Sheathing gas flowrate [mm]: | 108 |
| Plasmagene gas (central) [$O_2$, Ar, or others]: | Ar |
| Plasmagene gas flowrate [mm]: | 32 |
| Carrying gas (powder) [$O_2$, Ar, or others]: | Ar |
| Carrying gas flowrate [mm]: | 80 |
| Plate voltage [kV]: | 7.2 |
| Plate electric current [A]: | 5.1 |
| Grid electric current [A]: | 0.55 |
| Calculated power [kW]: | 36.72 |
| Operating pressure [Torr]: | 51.1 |
| Number on the specimen carrier: | 1 |
| Position on the specimen carrier: | 4 |
| Pump speed: | 3.5 |
| Spraying distance [mm]: | 200 |
| Probe depth [mm]: | 160 |
| Controller parameters | |
| | |
| Number of passes: | 10 |
| Rotation number: | 3 |
| Rotation angle: | Between 9h00 and 16h00 |
| Offset position [mm]: | 50 |
| Specimen carrier speed [mm/s]: | 50 |
| time 0 (Rest at the offset) [s]: | 10 |
| time 1 (Rest at the opposite extremity) [s]: | 4 |

EXAMPLE 4

The electrolyte was sprayed on top of the anode with the spraying parameters described in Table 2. Nitrates were used but a powder can also be used. A supersonic nozzle was used to achieve a high density of the electrolyte material.

TABLE 2

| | |
|---|---|
| Electrolyte material [GDC, SDC or others]: | GDC |
| Solution - Electrolyte | |
| | |
| Electrolyte - Raw material [Nitrate or others]: | Nitrates |
| Exact chemical composition (including hydratation): | $Ce(NO_3)_3 * 6H_2O$ |
| Electrolyte salt weight [g]: | 146.742 |
| Additive - Raw material [Nitrates or others]: | Nitrates |
| Exact chemical composition (including hydratation): | $Gd(NO_3)_3 * 6H_2O$ |
| Additive salt weight [g]: | 37.79 |
| Molar ratio additive/electrolyte [% wt]: | 25 |
| Plasma deposition | |
| | |
| Plasma torch [PL-35, PL-50]: | PL-50 |
| Supersonic flow [Yes or No]: | Yes |
| Sheathing gas [$O_2$, Ar, or others]: | $O_2$ |
| Sheathing gas flowrate [mm]: | 102; 108 |
| Plasmagene gas (central) [Ar or others]: | Ar |
| Plasmagene gas flowrate [mm]: | 40; 30 |
| Carrying gas (powder) [$O_2$, Ar, or others]: | Ar |
| Carrying gas flowrate [mm]: | 40; 80 |
| Plate voltage [kV]: | 7.5; 8.8 |
| Plate electric current [A]: | 5.2; 6.2 |
| Grid electric current [A]: | 0.6; 0.65 |
| Calculated power [kW]: | 39.0; 54.56 |
| Operating pressure [Torr]: | 58.0; 50.5 |
| Number on the specimen carrier: | 1 |
| Position on the specimen carrier: | 4 |
| Pump speed: | 3.5 |
| Spraying distance [mm]: | 200 |
| Probe depth [mm]: | 155 |
| Controller parameters | |
| | |
| Number of passes: | 15; 15 |
| Offset position [mm]: | 50 |
| Specimen carrier speed [mm/s]: | 50 |
| time 0 (Rest at the offset) [s]: | 10 |
| time 1 (Rest at the opposite extremity) [s]: | 0.5 |

EXAMPLE 5

The cathode is the last coating that is carried out and suspensions and solutions have been used. One skilled in the art will appreciate that powders can be used instead of suspensions and solutions.

TABLE 3

| | |
|---|---|
| Cathode material [LSC or others]: | LSC |
| Solution data | |
| | 117.7500 g La(NO$_3$)$_3$ * 6H$_2$O |
| | 14.5148 g Sr(NO$_3$)$_2$ |
| | 100.8397 g Co(NO$_3$)$_2$ * 6H$_2$O |
| | 40 g Glycine |
| | 200 ml H$_2$0 |
| Cathode | |
| Raw material [Nitrate or others]: | Nitrate |
| Plasma Deposition | |
| Plasma torch [PL-35, PL-50]: | PL-50 |
| Supersonic flow [Yes or No]: | No |
| Nozzle diameter [mm]: | 45 |
| Sheathing gas [O$_2$, Ar, or others]: | O$_2$ |
| Sheathing gas flowrate [mm]: | 108 |
| Plasmagene gas (central) [Ar or others]: | Ar |
| Plasmagene gas flowrate [mm]: | 30 |
| Carrying gas (powder) [O$_2$, Ar, or others]: | Ar |
| Carrying gas flowrate [mm]: | 100 |
| Calculated power [kW]: | 35 |
| Pump speed [ml/min]: | 20 |
| Spraying distance [mm]: | 225 |
| Probe depth [mm]: | 160 |
| Controller parameters | |
| | Preheating |
| Number of passes: | 4 |
| Rotation number: | 0 |
| Rotation angle: | 0 |
| Rotation speed: | 0 |
| Offset position [mm]: | 50 |
| Specimen carrier speed [mm/s]: | 35 |
| time 0 (Rest at the offset) [s]: | 10 |
| time 1 (Rest at the opposite extremity) [s]: | 0 |

EXAMPLE 6

The open circuit voltage (OCV) obtained was 650 mV. The bench test was operated with H$_2$ at 18 ml/min and air. Some other results with CH$_4$ at 5 ml/min show a OCV of 700 mV and a very low power density of 2.1 mW/cm$^2$.

FIG. 8 shows a microstructure of a typical sprayed cell on a reformer support.

The embodiments of the invention described above are intended to be exemplary only. For example, the experimental parameters used to produce a fuel cell in the above described examples can be modified in accordance with the size, the composition, and the properties of the fuel cell. The scope of the invention is therefore intended to be limited solely by the scope of the appended claims.

What is claimed is:

1. A reformer supported solid oxide fuse cell comprising:
    an electroconductive and porous reformer including a catalytically active material and shaped to constitute a slab having an unexposed first surface and a second surface opposite the first surface, and a plurality of adjacent grooves along the first surface, and flat regions adjacent the plurality of grooves;
    an anode layer having an unexposed first surface superposed to the first surface of the reformer slab and a second surface opposite the anode first surface, the anode layer covering the plurality of grooves of the reformer slab and having a corresponding grooved shape;
    an electrolyte layer having a first surface superposed to the second surface of the anode layer and a second surface opposite the electrolyte first surface, the electrolyte layer covering the anode layer over the plurality of grooves of said reformer slab and having a corresponding grooved shape, and extending over the flat regions; and
    a cathode layer having an unexposed first surface superposed to the second surface of the electrolyte layer, the cathode layer covering the electrolyte layer over the plurality of grooves of said reformer slab and having a corresponding grooved shape.

2. A reformer supported solid oxide fuel cell as claimed in claim 1, wherein the thickness of the slab ranges between 1 and 5 millimeters.

3. A reformer supported solid oxide fuel cell as claimed in claim 1, comprising at least one bipolar plate, the slab being contiguous to one of said at least one bipolar plate.

4. A reformer supported solid oxide fuel cell as claimed in claim 1, wherein said catalytically active material comprises between 10% and 30% wt of polymeric ceramic.

5. A reformer supported solid oxide fuel cell as claimed in claim 1, wherein the thicknesses of said anode layer, said electrolyte layer, and said cathode layer range between 5 and 100 micrometers.

6. A reformer supported solid oxide fuel cell as claimed in claim 1, wherein said anode layer comprises a mixture of an electrolyte and a metal catalyst.

7. A reformer supported solid oxide fuel cell as claimed in claim 1, wherein said electrolyte layer comprises a doped ceramic ionic conductor.

8. A reformer supported solid oxide fuel cell as claimed in claim 1, wherein said cathode comprises a perovskite material selected from the group consisting of: lantanum strontium manganate, lantanum strontium ferrite, and lantanum strontium cobalt ferrite.

9. A reformer supported solid oxide fuel cell as claimed in claim 1, wherein said solid oxide fuel cell is operable between 500 and 700° C.

10. A reformer supported solid oxide fuel cell as claimed in claim 1, wherein the anode layer and the cathode layer have a substantially identical surface area S1.

11. A reformer supported solid oxide fuel cell as claimed in claim 1, wherein the electrolyte layer and the reformer slab have a substantially identical surface area S2.

12. A reformer supported solid oxide fuel cell as claimed in claim 1, wherein at least one of the anode layer and the cathode layer has a surface area S1 and wherein at least one of the electrolyte layer and the reformer slab has a surface area S2, larger than the surface area S1.

* * * * *